Patented Feb. 26, 1935

1,992,582

UNITED STATES PATENT OFFICE 1,992,582

METHOD OF MANUFACTURING ROLLED BUCKWHEAT

Rinjiro Sasaki, Oaza Sendagaya, Sendagaya-Machi, Toyotama-Gori, Tokyo, Japan, assignor to Zaidan Hojin Ryoshoku Kenkyu-Kwai, Tokyo Prefecture, Japan No Drawing. Application October 24, 1932, Serial No. 639,381. In Japan February 26, 1932

9 Claims. (Cl. 99—10)

This invention relates to a method of manufacturing rolled buckwheat, which consists in removing the black outer husk of the grains of buckwheat, steaming them with water-vapor during or after treatment with one or more of protein coagulating reagents harmless to human body such as certain organic acids or alcohols, rolling or flattening the same thereafter into flakes and finally drying.

One object of the invention is to coagulate water soluble proteins contained in the grains by the action of the protein coagulating reagent or reagents so that the rolled product, when cooked, is not dissolved or crushed and is preserved in its original rolled form.

A further object of the invention is to obtain rolled buckwheat of delicious taste and having a higher nutritive value.

A still further object of the invention is to manufacture rolled buckwheat which does not deteriorate or ferment for long periods on account of the sterilizing action of the protein coagulating reagents.

It has long been known that grains of buckwheat are ground into powder, and that the powdered buckwheat is, in Japan, manufactured or prepared into "Soba-kaki" or a buckwheat broth, "Soba-mochi" or a buckwheat dough, or "Soba-kiri", or a buckwheat spaghetti, and, in Europe and America, used as ingredients of soups, broths, pancakes and various other cakes. However, the means of utilizing the grain have not been improved at all and have remained unchanged. Especially the grains have not been known to be separated from their black outer husks without being crushed and served for boiled meal as in the case of cereals. This is due to the fact that the grain is of a triangular form which makes it difficult to hull the black outer husk, and that the grain is brittle and inclined to be easily crushed.

In order to soften the structure of the grain for a rolling or flattening purpose, the grain has been immersed in water or treated with water vapor. But, the grain is rendered pasty by such treatment due to the fact that a great amount of protein is dissolved out. The grain is also darkened in color by such treatment. The grain thus treated is therefore in no way adapted for being worked up to a finished rolled product. It is also found that the grain, when its black outer husk is removed or when it is powdered, is easily attacked by microorganisms when stored, especially by molds and insects, and thus it deteriorates in quality to a far greater extent than cereals such as rice, wheat, oats or barley. The grain is also incapable of resisting the actions of sun-light and moisture.

Further, the most important problem is the preservation of the nutritive value of buckwheat. Buckwheat contains protein of very high nutritive value rarely seen in other vegetable foods. However, about 40% of the protein is water soluble and therefore, when it is, for example, used as "Soba-kiri", a buckwheat spaghetti, a great portion of the proteins and vitamins contained in the grain is lost in the preparation together with substances which are finely powdered resulting in a loss of a great part of the nutritive value. It will therefore be easily understood that the whole kernel of the buckwheat must be prepared into a finished product if one wishes to make use of the valuable nutritious matters contained in the grain.

In consideration of the above facts and also of the fact that the grain of the buckwheat can be separated from its black outer husk by some means and flattened into flakes by rollers, the inventor strived to obtain rolled buckwheat without sacrificing in any way the nutritious matters contained therein. However, the grain is brittle and easily crushed as mentioned above. Further, it has high content of soluble matters, especially of soluble protein, so that when boiled, it can never preserve its original rolled form if it is not subjected to some preparatory treatment. In order to remove this and the other disadvantages mentioned above, experiments have been made in the direction of coagulating the protein contained in the grain. For this purpose, various protein coagulating reagents have been selected and examined, and it was found that certain organic acids, such as acetic acid, propionic acid, lactic acid, malic acid, tartaric acid and citric acid, or certain alcohols, such as ethyl alcohol, methyl alcohol, propyl alcohol and butyl alcohol are good protein coagulating reagents and also harmless to the human body in themselves or after they are volatilized off. According to the invention, the grains separated from their black outer husks by mechanical means are immersed in an aqueous solution of the above-mentioned protein coagulating reagent or reagents, and then treated with water vapor or the grains after separation from their black outer husks may be directly treated with water vapor containing vapors of one or more of volatile protein coagulating reagents and thereafter rolled or flattened into flakes.

The above-mentioned alcohols and acetic acid can be utilized in the form of aqueous solution as well as vapor. The certain other organic acids, other than acetic acid, can be used in the form of aqueous solutions.

The temperature at which the above operation is performed is preferably below 70° C., which is the expanding point of starch, and the most preferable temperatures are those not exceeding 50° C. It has been found that, when the temperature is regulated below the expanding point of starch, the grains of buckwheat are prevented from being crushed or being rendered tacky, and that, after such treatment, the grains do not stick to the rollers when subjected to the rolling operation. In addition, when the grains are subjected to water vapor treatment, the protein coagulating reagent can penetrate deeply into the interior of the grains thus treated, and sufficiently coagulate the protein contained therein. By this treatment the structure of the grains is also made elastic, and consequently the tendency of the grains to be crushed is highly decreased.

It has been noted that the grains, separated from their black outer husks, are easily affected by sun-light and moisture during storage, due to the propagation of microorganisms, which is, however, prevented by the treatment according to the invention because of the sterilizing action of the organic acids or alcohols mentioned above. It has been experimentally proved that the specific organic acids or alcohols mentioned above render the grains resistive to fermentation during a long period of storage.

It is further found that the coagulation of protein is better effected by the organic acids than by the alcohols, and that acetic acid is best adapted for that purpose, and further that the action of coagulation can be accelerated in the presence of the alcohols. As to the sterilizing action, alcohols, especially methyl alcohol and ethyl alcohol are most powerful, and this action can be accelerated in the presence of the above mentioned acids. In practice therefore, the combined use of acetic acid and ethyl alcohol is found to be the most satisfactory.

For facilitating the rolling operation, and for neutralizing the acid or acids which may remain accompanied by the odor specific to the acid or acids, it is preferable to dust powdered calcium carbonate over the grains after they have been steamed, and then they are subjected to the rolling operation. By this means, calcium is also incorporated into the rolled product and thereby increases its nutritive value. It is interesting here that the dusting of the powdered calcium carbonate makes the rolling of the grains easy and increases the nutritive value of the product when they have no trace of acid or acids.

The advantages and features of the invention may be summarized as follows:

1. The product obtained by the process of the present invention is glossy, beautiful and less apt to be crushed. The process gives a high yield.

2. The product is not crushed when boiled, maintaining its original rolled form, and can be prepared into an edible material of delicious taste.

3. The product does not deteriorate during a long storage period, and its taste is in no way damaged.

4. All the nutritious ingredients of the grain remain in the product. Consequently the product contains not only a great quantity of protein, but also an abundance of vitamins.

5. The fact that buckwheat is poor in calcium content can be compensated by using powdered calcium carbonate, which is incorporated in the rolled product.

Several examples of carrying out the invention are given below:—

Example 1

Cases where one kind of the protein coagulating reagents is used in vapor form.

The black outer husks of buckheat are removed by means of a hulling-mill or huller, taking care not to crush their kernels. The grains thus separated from their husks are then steamed with vapor generated by boiling an aqueous solution of one of the protein coagulating reagents in the following quantity per liter of water.

| | |
|---|---|
| 80% methyl alcohol | 400 ml. |
| 80% ethyl alcohol | 600 ml. |
| 80% propyl alcohol | 1000 ml. |
| 95% butyl alcohol | 1000 ml. |
| Glacial acetic acid | 100 grs. |

Temperatures not above 50° C. are best for the treatment, and the treatment is continued for 15 to 30 minutes.

If powdered calcium carbonate is used, it is added to the grains thus treated and mixed therewith, in proportion, say, of 2 grs. per kg. of the latter and then the grains are flattened by a roller and dried.

Example 2

Cases where the grains are immersed in an aqueous solution of one of the protein coagulating reagents.

After the grains have been separated from their black outer husks in the same manner as in Example 1, they are immersed in an aqueous solution of one of the protein coagulating reagents in the following proportion per liter of water.

| | |
|---|---|
| 80% methyl alcohol | 1.7 L. |
| 80% ethyl alcohol | 1.7 L. |
| 80% propyl alcohol | 1.7 L. |
| 95% butyl alcohol | 1.7 L. |
| Acetic anhydride (glacial acetic acid) | 4.0 grs. |
| Pure propionic acid | 5.0 grs. |
| Pure butyric acid | 5.9 grs. |
| Lactic acid | 6.0 grs. |
| Malic acid | 4.5 grs. |
| Tartaric acid | 5.0 grs. |
| Citric acid | 7.0 grs. |

After immersing for about 20 minutes, the grains are taken out of the bath, and preferably at a temperature not exceeding 50° C. steamed with water vapor for 7 to 15 minutes, and then rolled or flattened into flakes, and finally dried.

In this example, if desired, powdered calcium carbonate is dusted over the grains after they have been steamed in the proportion of 2 grs. per kg. of the latter, and the grains are then rolled and dried.

Example 3

Cases where several kinds of the protein coagulating reagents are mixed and used in vapor form.

The hulling, steaming and rolling operations are the same as in Example 1.

(1) Case where the mixed vapor of alcohols is used.

When two kinds of the alcohols are employed, they are mixed in one-half the quantity given in Example 1; in the case of employing three kinds of alcohols, in one-third the quantity given and in the case of four kinds of alcohols, in one-quarter the quantity given.

(2) Case where the mixed vapor of the alcohols and acetic acid is used.

(a) In the case employing one kind of alcohol and acetic acid, the following ratio per liter of water is used.

300 ml. of 80% methyl alcohol and 50 grs. of acetic acid.
400 ml. of 80% ethyl alcohol and 50 grs. of acetic acid.
700 ml. of 80% propyl alcohol and 50 grs. of acetic acid.
700 ml. of 95% butyl alcohol and 50 grs. of acetic acid.

(b) When two or more kinds of alcohol and acetic acid are used, they are used in the following ratio per liter of water:

Two kinds of alcohol (each in one-half the amount given in Example 3, case 2a) and 50 grs. of acetic acid.
Three kinds of the alcohol (each in one-third the amount given in Example 3, case 2a) and 50 grs. of acetic acid.
Four kinds of alcohol (each in one-quarter the amount given in Example 3, case 2a) and 50 grs. of acetic acid.

In this example also, the powdered calcium carbonate may be used in the same manner as in Examples 1 and 2.

*Example 4*

Cases where an aqueous solution containing several kinds of the protein coagulating reagents, is employed as a bath.

The operations of hulling, steaming and rolling are all the same as in Exmaple 2.

(1) When two kinds of alcohol are used, they are mixed in the proportion of one-half the amount of that given in Example 2, when three kinds of alcohols are used, one-third the amount, and so forth.

(2) The same applies also to the case of using more than two kinds of the acids. That is, if two kinds of acids are used, they are mixed in one-half the amount of that given in Example 2, and so forth.

(3) When a mixed solution of alcohol and acids is used, they are used in the following proportion per liter of water.

300 ml. of 80% methyl alcohol and 2.0 grs. of acetic acid.
400 ml. of 80% ethyl alcohol and 2.5 grs. of propionic acid.
700 ml. of 80% propyl alcohol and 2.9 grs. of butyric acid.
700 ml. of 95% butyl alcohol and—
3.0 grs. of lactic acid.
2.3 grs. of malic acid.
2.5 grs. of tartaric acid.
3.5 grs. of citric acid.

(a) The above table shows the proportions in which one kind of alcohol and one kind of acid are mixed.

(b) In case of employing two kinds of the alcohols and two kinds of the acids, they are mixed each in one-half the amount of that given in the above table.

(c) When one kind of alcohol and two kinds of acid are used, the alcohol is used in the same amount as given in the above table, while each of the two acids is used in one-half the amount of that given in the above table.

(d) When more than two kinds of alcohol and acid are employed, they are mixed on the principle which is easily derived from the above cases b and c.

In this example also, the powdered calcium carbonate can be used as in Examples 1, 2 and 3.

As described above, the invention is carried out in numerous ways, but the most typical one is as follows:—

Outer husks of the grains are removed by a hulling mill and screened off, and then the grains are steamed with vapor generated by boiling an aqueous solution containing 50 grs. of glacial acetic acid and 400 grs. of ethyl alcohol per liter of water. The temperature should not exceed 50° C., and the treatment is continued for 20 minutes. Thereafter, 1 kg. of the grains is mixed with 2 grs. of powdered calcium carbonate, and is rolled or flattened into flakes in the known way by a roller, and finally dried.

What I claim is:—

1. A method of manufacturing rolled buckwheat or buck-wheat flakes, consisting in removing black outer husk from grains of buck-wheat, steaming the grains with water-vapor after treatment with a reagent selected from the group consisting of methyl alcohol, ethyl alcohol, propyl alcohol, butyl alcohol, acetic acid, propionic acid, butyric acid, lactic acid, malic acid, tartaric acid and citric acid; and rolling the steamed grain into flakes and drying.

2. A method of manufacturing rolled buckwheat or buck-wheat flakes, consisting in removing black outer husk from grains of buck-wheat, steaming the grains with water vapor mixed with vapor of a reagent selected from the group consisting of methyl alcohol, ethyl alcohol, propyl alcohol, butyl alcohol, acetic acid, propionic acid, butyric acid and lactic acid, and rolling the steamed grain into flakes and drying.

3. A method of manufacturing rolled buckwheat or buck-wheat flakes, consisting in removing black outer husk from grains of buck-wheat, steaming the grains with water-vapor after treatment with an aqueous solution of a reagent selected from the group consisting of methyl alcohol, ethyl alcohol, propyl alcohol butyl alcohol, acetic acid, propionic acid, butyric acid, lactic acid, malic acid, tartaric acid and citric acid, and rolling the steamed grain into flakes and drying.

4. A method of manufacturing rolled buckwheat or buck-wheat flakes, consisting in removing black outer husk from grains of buck-wheat, steaming them with water-vapor mixed with vapors of more than one reagent selected from the group of methyl alcohol, ethyl alcohol, propyl alcohol, butyl alcohol, acetic acid, propionic acid, butyric acid and lactic acid, and rolling the same into flakes and drying.

5. A method of manufacturing rolled buckwheat or buck-wheat flakes, consisting in removing black outer husk from grains of buck-wheat, steaming them with water-vapor after treatment with an aqueous solution of more than one reagent selected from the group of methyl alcohol, ethyl alcohol, propyl alcohol, butyl alcohol, acetic acid, propionic acid, butyric acid, lactic acid, malic acid, tartaric acid and citric acid, rolling the same into flakes and drying.

6. A method of manufacturing rolled buckwheat or buck-wheat flakes, consisting in removing black outer husk of grains of buck-wheat, steaming them with water-vapor together with the vapor of a reagent selected from the group of methyl alcohol, ethyl alcohol, propyl alcohol, butyl alcohol, acetic acid, propionic acid, butyric acid and lactic acid at a temperature below the expanding point of starch and dusting the treated buck-wheat with powdered calcium carbonate, rolling the same into flakes and drying.

7. A method of manufacturing rolled buck-wheat or buck-wheat flakes, consisting in removing black outer husk of grains of buck-wheat, steaming them with water-vapor together with the vapor or more than one reagent selected from the group of methyl alcohol, ethyl alcohol, propyl alcohol, butyl alcohol, acetic acid, propionic acid, butyric acid and lactic acid at a temperature below the expanding point of starch and dusting with powdered calcium carbonate, rolling the product into flakes and drying.

8. A method of manufacturing rolled buck-wheat or buck-wheat flakes, consisting in removing black outer husk of grains of buck-wheat, immersing the grains into an aqueous solution of a reagent selected from the group of methyl alcohol, ethyl alcohol, propyl alcohol, butyl alcohol, acetic acid, propionic acid, butyric acid, lactic acid, malic acid, tartaric acid and citric acid, steaming the same with water-vapor at a temperature below the expanding point of starch and dusting the steamed product with powdered calcium carbonate, rolling the product into flakes and drying.

9. A method of manufacturing rolled buck-wheat or buck-wheat flakes, consisting in removing black outer husk of grains of buck-wheat, immersing the grains into an aqueous solution of more than one reagent selected from the group of methyl alcohol, ethyl alcohol, propyl alcohol, butyl alcohol, acetic acid, propionic acid, butyric acid, lactic acid, malic acid, tartaric acid and citric acid, steaming the same with water-vapor at a temperature below the expanding point of starch and dusting the steamed product with powdered calcium carbonate, rolling the product into flakes and drying.

RINJIRO SASAKI.